United States Patent [19]

Williams

[11] Patent Number: 5,192,039

[45] Date of Patent: Mar. 9, 1993

[54] HANGER INSULATION SYSTEM

[75] Inventor: Robert O. Williams, Gladwin, Mich.

[73] Assignee: Ticon, Inc., Midland, Mich.

[21] Appl. No.: 772,269

[22] Filed: Oct. 7, 1991

[51] Int. Cl.$^5$ .............................................. F16L 3/00
[52] U.S. Cl. ..................................... 248/62; 138/107; 138/149; 248/68.1
[58] Field of Search ................... 248/68.1, 58, 59, 62; 138/107, 149

[56] References Cited

U.S. PATENT DOCUMENTS

| | | | |
|---|---|---|---|
| 3,000,433 | 9/1961 | Kemper | 248/62 |
| 3,122,346 | 2/1964 | Seiler | 248/62 |
| 3,151,633 | 10/1964 | Shuman | 138/177 |
| 3,244,388 | 4/1966 | Coffman | 138/107 X |
| 3,415,474 | 12/1968 | Kindorf | 248/62 |
| 3,530,899 | 9/1970 | Breeding | 138/106 |
| 3,539,137 | 11/1970 | March | 248/49 |
| 3,652,045 | 3/1972 | Hirt | 248/62 |
| 3,881,864 | 5/1975 | Nicol | 432/233 |
| 3,933,377 | 1/1976 | Arrowood | 285/61 |
| 4,146,203 | 3/1979 | Williams | 248/62 |
| 4,185,802 | 1/1980 | Mules et al. | 248/68.1 X |
| 4,243,453 | 1/1981 | McClintock | 138/149 X |
| 4,323,088 | 4/1982 | McClellan | 248/62 X |
| 4,327,778 | 5/1982 | Williams | 138/155 |
| 4,363,681 | 12/1982 | Williams | 156/64 |
| 4,605,043 | 8/1986 | Grenier | 138/149 |
| 4,772,507 | 9/1988 | Leo, Jr. et al. | 138/149 X |
| 4,850,397 | 7/1989 | Grenier | 138/149 |
| 5,020,481 | 6/1991 | Nelson | 138/149 X |

Primary Examiner—David L. Talbott
Attorney, Agent, or Firm—Price, Heneveld, Cooper, DeWitt & Litton

[57] ABSTRACT

A unitary pipe insulation and shield assembly of upper and lower partially cylindrical insulation elements defining a cylindrical pipe receiving cavity, a surrounding water repellant jacket having an integral hinge, and channel ring clamp elements fastenable together, the insulation elements, jacket and clamp elements being secured together to form a clamshell arrangement extendable about a pipe to snap fasten the clamp elements together.

5 Claims, 2 Drawing Sheets 5,192,039

HANGER INSULATION SYSTEM

BACKGROUND OF THE INVENTION

This invention relates to pipe hanger insulation, and particularly to a unitary, clamshell, pipe insulating and shield assembly for fluid conducting pipes.

Piping conduit as for chemical processing plants is frequently insulated over the length thereof to maintain temperature conditions, typically elevated, of the fluid being conducted These conduits are normally suspended from a series of spaced clevis hangers shown, for example, in U.S. Pat. No. 4,146,203 to the inventor herein. At each hanger is an insulation assembly, typically cylindrical, around which the hanger extends. Common materials used for making components of these insulation assemblies are calcium silicate, foam polymer, cellular or fibrous glass.

During installation of the system, workmen who suspend the piping typically install the lower, generally semicylindrical block beneath the pipe when installing the hanger. The upper part is left to insulation installing workmen who subsequently install insulation jackets over the length of the pipe between the hangers. Insulation installers dislike the task of inserting the upper block and completing assembly of the hanger arrangement since it is difficult to get the various components properly assembled with each other while the pipe is suspended. Consequently, less than a desirable job is too often performed.

Another fairly common, undesirable occurrence is the tendency for the hanger to slip off the end of the installed lower insulation block. If a weather resistant shield is applied, it tends to work out of place in the hanger.

Moreover, during the interval between insertion of the lower block and the subsequent time when the insulation installer completes the assembly, the lower block is exposed to the weather which damages and/or negates the function of the insulation material. Sometimes a sheet of plastic is wrapped around the lower block in efforts to protect it, but this makes subsequent insertion of the remaining components even more cumbersome All of these factors detract from proper insulation and/or suspension of the pipe.

SUMMARY OF THE INVENTION

An object of this invention is to provide a unitary, clamshell, pipe support, insulation and shield assembly readily and quickly installed as a unit on the pipe when hanging the piping conduit. The assembly is formed of interlocking members of a jacket around interfitting insulation components, and surrounded by a channel ring, the ends of which are snap fitted together to attach the assembly around the pipe as a unit. The channel ring and jacket are attached to rigid portions of upper and lower elements to form the clamshell bound in an assembly. A conventional U-clamp is retained axially in position by the configuration of the channel ring, and locks the channel ring snap fitting together. The U-clamp is pivotally connected to the hanger clevis in conventional fashion. The resulting assembly is easy and quick to install when hanging the pipe such that the subsequent insulation installer need not insert insulation or even be concerned about completing the insulation of these hanger areas. It is weather resistant, is supportive of the pipe in optimum fashion, and is resistant to movement of the hanger away from the unitary assembly.

These and other objects, advantages and features of the invention will become apparent upon studying the following specification in conjunction with the drawings.

DESCRIPTION OF THE PREFERRED EMBODIMENT

Figure 1:
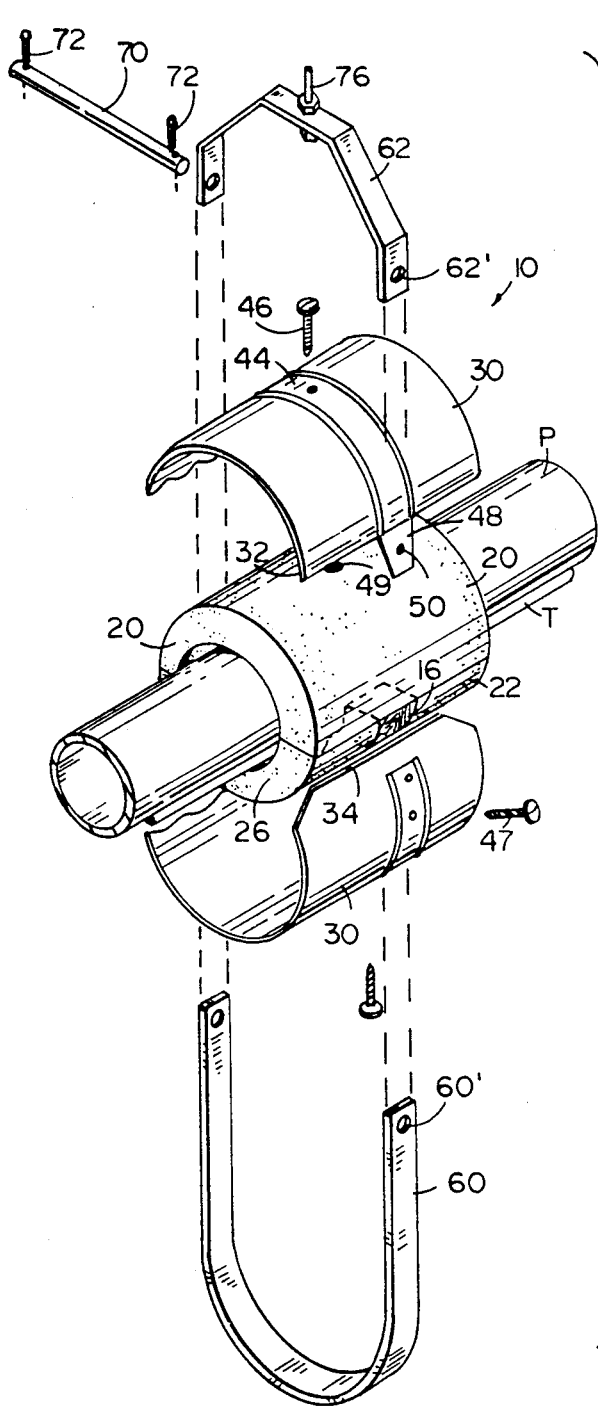
FIG. 1 is a perspective exploded view of an assembly showing the invention.
Figure 2:
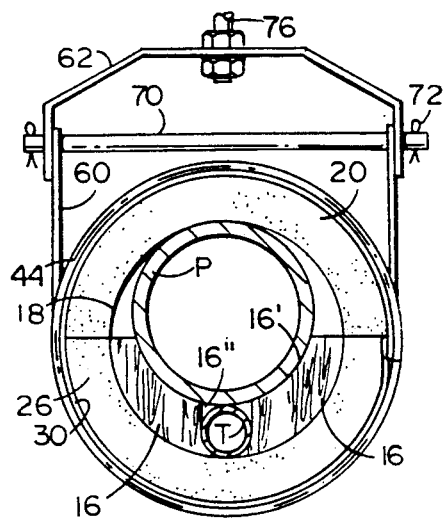
FIG. 2 is an end elevational view of the unitary assembly with the hanger, and on a conduit having one tracer line.
Figure 3:
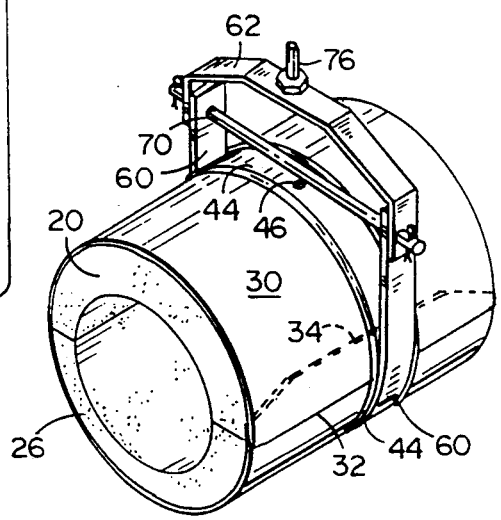
FIG. 3 is a perspective view of the unitary assembly with the hanger and without a pipe.
Figure 4:
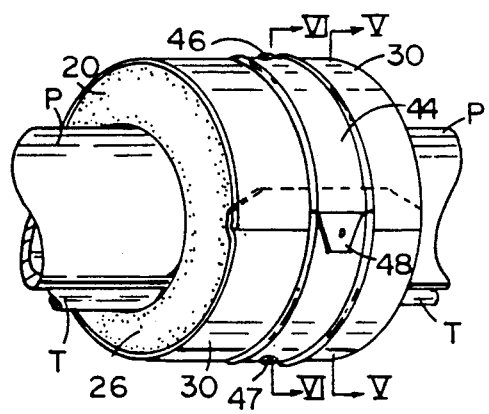
FIG. 4 is a perspective view of the unitary assembly without the hanger.
Figure 5:
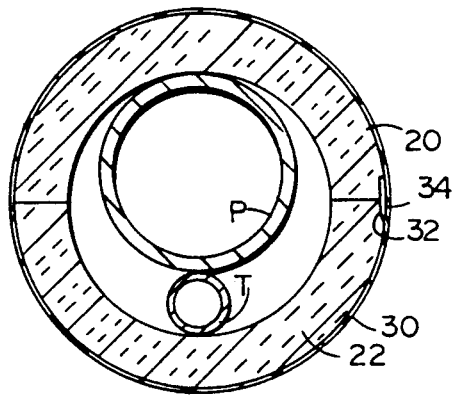
FIG. 5 is a sectional view taken on plane V—V of FIG. 4.

Referring now specifically to the drawings, the unitary insulated pipe hanger assembly 10 for suspending a pipe conduit P shown to have a single tracer line T for temperature control is shown. Beneath the pipe and forming the center portion of the lower clamshell member is a rigid, semicylindrical pipe support 16 as of wood or other firm material. If desired, an upper support (not shown) may form the central portion of the upper clamshell member. Lower support 16 has sufficient rigidity to support the weight of the pipe without crushing. The lower block or clamshell member has an inner, concave, semicylindrical upper surface 16' of a diameter which corresponds with the outer diameter of pipe P. Preferably the tracer conduit line T carrying a hot fluid or the like is beneath pipe P, surface 16' having a recess 16''' at the lowermost portion thereof to receive tracer line T. The depth of recess 16''' is basically equal to the diameter of the tracer pipe to support the tracer line in engagement with main conduit pipe P. This rigid support member 16 may be made of wood or other rigid material having excellent heat insulating properties, such as a rigid polymeric foam If support portion 16 is made of foam, it preferably has an insert dowel of wood or other rigid, nonheat-conducting material at the bottom thereof for receiving a threaded fastener such as a screw, in a manner and for reasons to be explained hereinafter. Inner surface 16' forms part of a cylinder. The outer surface of component 16 forms a portion of a larger diameter cylinder, and extending 180° in an arc swept from the axial centerline of the assembly. This axial centerline of the assembly is offset vertically from the axial centerline of pipe P, and specifically below the pipe centerline when tracer T is below the pipe (and above the pipe centerline when tracer T is above the pipe).

Figure 8:
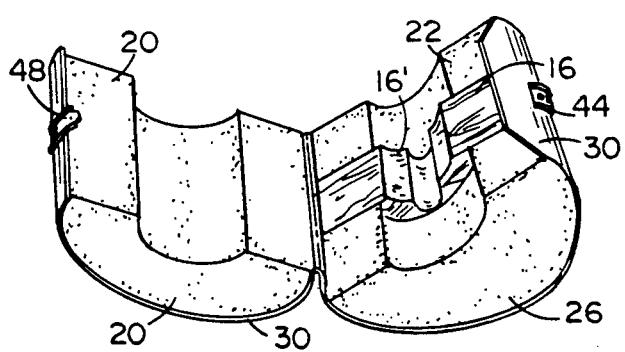
FIG. 8 is a perspective view of the apparatus in FIG. 7.

On both ends of, i.e., straddling, support 16 are semicylindrical insulation sleeves, one sleeve being lower semicylindrical element 22 and the other sleeve being lower semicylindrical element 26 (FIG. 8). The upper semicylindrical insulation member 20 is shown to extend the length of the assembly. The inner diameter of these insulation members is substantially equal to the diameter of pipe P plus the diameter of tracer T, while the outer diameter is substantially equal to that of support 16. The insulation sleeves are preferably formed of a suitable foam polymer such as polyurethane, polystyrene, or the like.

Extending around and enclosing the periphery of support 16 and sleeves 22 and 26 and insulation member 20 is a weather resistant jacket housing 30 which constitutes a one-piece member having peripherally extending, overlapping but separable edges 32 and 34 at one peripheral location, and made of a water repellant, flexible material such as reinforced, coated cloth, thin metal or the like. The jacket has an axially extending zone forming flexible hinge 30' approximately 180° displaced from the edges 32 and 34. This hinging action is made by bending the jacket since it normally needs to be used as a hinge only once, that is, when it is installed on a pipe. When the clamshell is closed, one end of jacket 30 (here edge 34) is slid beneath the other edge (here 32) to assure the jacket closure over the entire periphery of the insulation.

Figure 6:
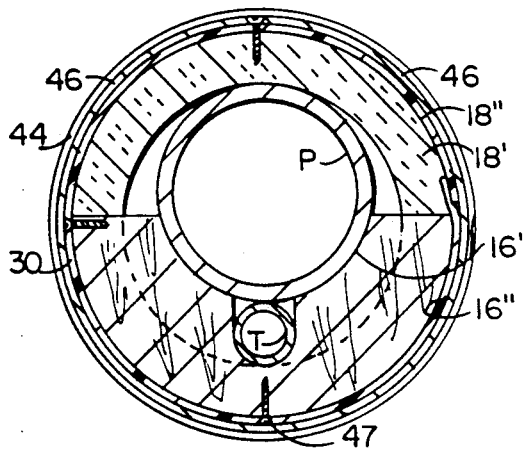
FIG. 6 is a sectional elevational view taken on plane VI—VI of FIG. 4.
Figure 7:
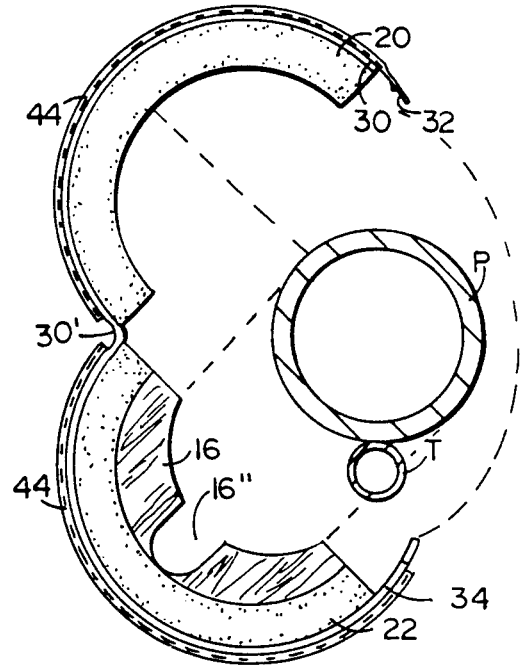
FIG. 7 is an elevational view of the unitary assembly in FIGS. 4–6, shown open to be placed on a pipe conduit.

Around housing 30 and attached thereto is a pair of elements forming a clamp ring. More specifically, a lower metal semicylindrical clamp ring element 40 extends around the lower part of housing 30 and is secured thereto by threaded fastener 42 which extends through ring portion 40, housing 30, and into support element 16. If support element 16 is formed of a polymeric material, a dowel as of wood or the like is preferably inserted and bonded into the support to receive each threaded fastener 47 (FIG. 6). This dowel also provides firm support for the pipe. The upper metal ring element 44 extends around the upper portion of housing 30 and is secured to the housing and insulation element 20 by threaded fastener 46 which extends through ring element 44, housing 30 and into member 20. Again, preferably a dowel plug 49 of wood or the like is in element 20 to receive threaded fastener 46. Each of elements 40 and 44 includes a pair of side ribs or flanges extending radially outwardly at the axial edges thereof. One of the clamp elements, here shown to be upper element 44, has a peripherally extending tab 48, extending to overlap lower element 40 and interfit therewith utilizing a snap-in detent connection. The detent or raised dimple 50 is shown on tab 48, with the cooperating receiving recess 52 shown on ring element 40. The flexible resilience of elements 40 and 44, and particularly tab 48, allows detent 50 to slide over tab 48 and snap under inherent bias into recess 52. This detent snap fitting is purposely on the lower 180° of the assembly, and preferably at one lateral side of the assembly. The snap fastener is thus lockable in place by the U-clamp placed therearound.

The conventional hanger includes a U-clamp 60 and clevis 62. U-clamp 60 extends around the bottom of the assembly within the channel-shaped ring element 40, i.e., between the side ribs thereof, extending upwardly 180° and then past the assembly for interfitting with clevis 62. The two lower ends of clevis 62 and the two upper ends of U-clamp 60 have orifices 62' and 60' respectively to align and receive a transverse pin or rod 70 therethrough. The ends of the rod have cotter keys 72 or the equivalent therein to hold the rod in place once assembled. A vertical hanger rod 76 suspends clevis 62.

The plurality of elements, as secured together and prior to actuation of the snap fastener, is a clamshell arrangement which can be easily and effectively placed around a pipe and then simply closed and snapped together It is locked in place by the U-clamp. The person hanging the pipe can very quickly install the unit without a hassle in mere moments.

Figure 9:
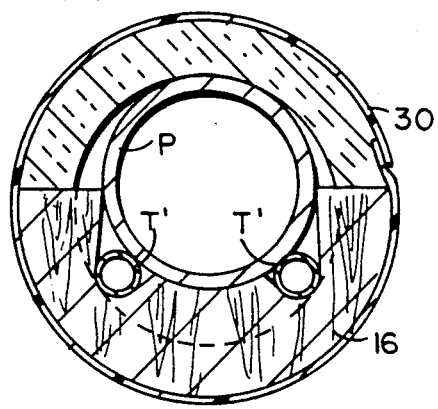
FIG. 9 is a sectional elevational view of the unitary assembly, shown on a conduit having two tracer lines.

It is conceivable that variations in addition to those already described, in accordance with the inventive concept, could be made in the preferred embodiment shown and described. One variation could be the use of two tracer lines T' as in FIG. 9, with appropriate recesses in the insulative support 116 to accommodate them, but the remaining components being comparable to those previously described The invention is not intended to be limited to the embodiment described in detail, but only by the appended claims and the reasonably equivalent structures to those defined therein.

The embodiments of the invention in which an exclusive property or privilege is claimed are defined as follows:

1. A unitary, clamshell, pipe insulation and shield assembly comprising:
   upper and lower, generally semicylindrical, insulation elements which together form a cylindrical subassembly having a rigid portion to support a pipe;
   said elements each having a partial cylindrical passage therethrough to collectively form a generally cylindrical passage for a pipe to extend through;
   a water repellant jacket around said elements having a pair of adjacent ends at a peripheral location around said jacket, and having a flexible hinge portion intermediate said ends for enabling said jacket ends to be spaced apart or together;
   said jacket ends having extensions which overlap each other when said assembly is closed;
   semicylindrical channel ring clamp elements having interconnectable ends for securing said clamp elements together around said jacket;
   said channel ring elements having pairs of radially outwardly extending curved flanges to define a curved channel therebetween for receiving and retaining a U-clamp; and
   said clamp elements, said jacket and said insulation elements being fastened together to form a hinged clamshell arrangement capable of being placed around a pipe and then closed and connected.

2. The unitary assembly in claim 1 including threaded fasteners extending through said ring elements, said jacket, and into said insulation elements to fasten them together.

3. The assembly in claim 1 wherein said channel ring interconnectable ends are resilient and have a dimple on one end and a protrusion on the adjacent end to form a snap detent interfit therewith.

4. A unitary pipe insulation and shield assembly comprising:
   upper and lower, generally semicylindrical, insulation elements which together form a cylindrical subassembly having a rigid portion to support a pipe;
   said elements each having a partial cylindrical passage therethrough to collectively form a generally cylindrical passage for a pipe to extend through;
   a water repellant jacket around said elements having a pair of adjacent ends at a peripheral location around said jacket and having a flexible hinge portion intermediate said ends for enabling said jacket ends to be spaced apart or together;

semicylindrical ring clamp elements having interconnectable ends opposite said hinge portion to secure said clamp elements in a ring around said jacket;

said ring clamp elements being channel-shaped in cross section, having a pair of radially outwardly extending flanges;

a U-clamp around said ring clamp elements and retained by said flanges;

fasteners between each of said clamp elements and said jacket and insulation elements to secure them together in an assembled clamshell arrangement for extending around a pipe and connecting said interconnectable ends; and said U-clamp engaging said interconnectable ends of said ring clamp elements to lock said ring clamp elements together.

5. A unitary insulation assembly for a suspended pipe comprising:

upper and lower insulation elements for fitting together around a pipe and including a rigid portion to support the pipe;

a weather resistant jacket secured around said elements, including hinge means for hinging said insulation elements together and apart;

said jacket being flexible intermediate its ends to form said hinge means as an integral hinge;

a channel ring around said jacket comprising a pair of arcuate members secured to said jacket spaced apart by said hinge means, and having interconnecting ends for securing said ring around said jacket and insulation elements as a unit;

said interconnecting ends having a detent snap fastener;

said channel ring having spaced retention flanges;

a U-clamp around said channel ring and retained between said flanges, and a suspension clevis pivotally attached to said U-clamp; and said U-clamp engaging and locking said interconnection ends of said channel ring together.

* * * * *